Aug. 21, 1945.  W. E. WINE  2,383,282
TRACTION UNIT
Filed May 5, 1943  2 Sheets-Sheet 1

Inventor
William E. Wine
By Ritter, Mechlem & Muir
His Attorneys

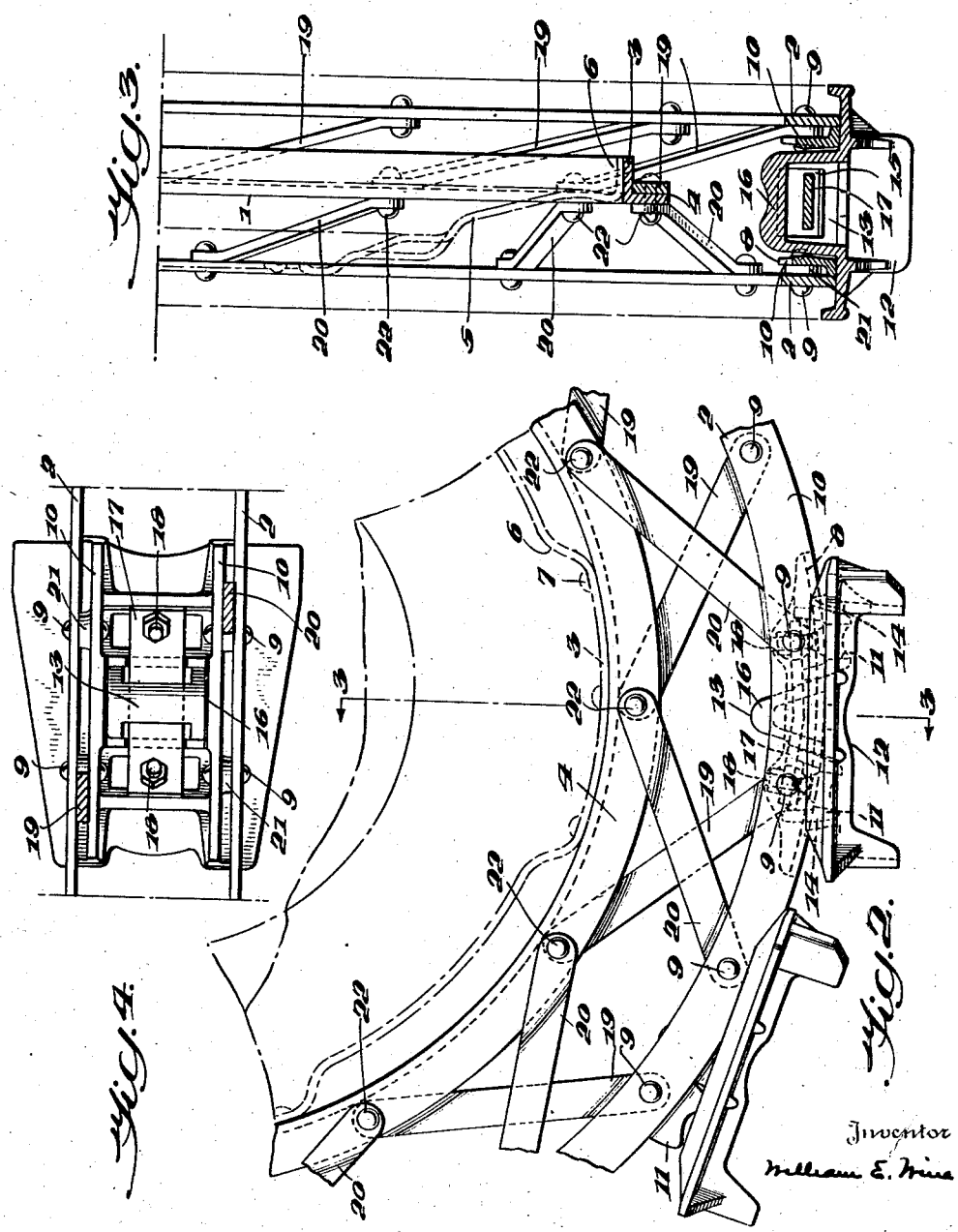

Patented Aug. 21, 1945

2,383,282

UNITED STATES PATENT OFFICE 2,383,282

TRACTION UNIT

William E. Wine, Toledo, Ohio

Application May 5, 1943, Serial No. 485,764

4 Claims. (Cl. 301—56)

My invention relates to tractor wheels and its principal object is to provide an annular traction unit which may be quickly applied to a tractor wheel in substitution for the conventional rubber tire and its supporting rim with which tractor wheels are now customarily provided.

A primary feature of the invention consists in forming a traction unit with an inner annular member and with a pair of rim elements which are rigidly connected in spaced relation by a plurality of spacer members having movable ground engaging shoes, the rim elements being connected to the inner annular member by a plurality of elongated members whose outer ends are alternately connected to the respective rim elements.

Another feature of the invention consists in rigidly connecting the rim elements of the traction unit to the inner annular member thereof by a plurality of elongated members which are secured to each of the spacer members of the rim elements at circumferentially spaced points, the elongated members which are connected to alternate spacer members having their inner ends secured to each other and the elongated members which are secured to adjacent spacer members having intermediate portions arranged in overlapping relation with each other.

Other and more specific features of the invention residing in advantageous forms, combinations and relations of parts will hereinafter appear and be pointed out in the claims.

In the drawings,

Figure 2 is an enlarged side elevation view of a portion of the traction unit, a portion of the wheel shown in Figure 1 being also shown in dot and dash lines.

Figure 3 is a vertical sectional view on line 3—3 of Figure 2.

Figure 4 is a detail sectional view on line 4—4 of Figure 3.

Figure 1:
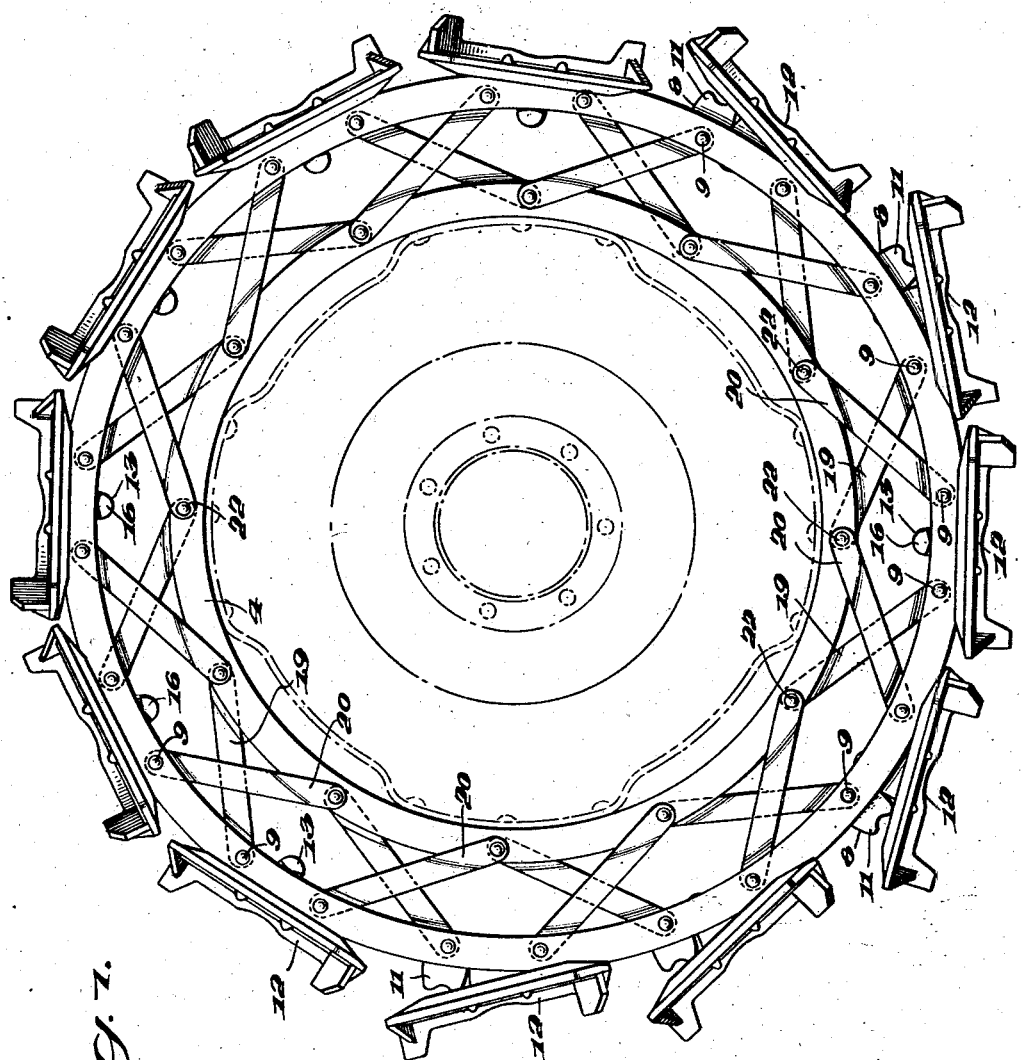
Figure 1 is a side elevational view of the annular traction unit, one form of wheel to which the unit is capable of being secured being shown in dot and dash lines.

Referring more particularly to the drawings, the annular traction unit is shown as having an inner annular member 1 and a pair of laterally spaced substantially parallel rim elements 2. The annular member 1 is preferably of angle shape having an axially extending flange 3 and an outwardly projecting flange 4. The inside diameter of member 1 is such that it is just slightly greater than the outside diameter of the wheel 5 to which the traction unit is to be applied; and the outside diameter of the unit should be approximately the same as the diameter of the rubber tire for which the traction unit is to be substituted.

The particular wheel 5 shown in dot and dash lines in the drawings is of the disk type and it is formed with an outer peripheral flange 6 to which the rim (not shown) for the conventional rubber tire is usually secured. This same flange affords convenient means whereby the traction unit may be rigidly attached to the wheel since the axial flange 3 of the annular member 1 may be easily and quickly connected thereto by any suitable securing means, such as rivets 7.

The rim elements 2 have interposed between them at suitable intervals a plurality of spacer members 8, each of which is secured to the rims at circumferentially spaced points by rivets 9.

The spacers are respectively provided with upright side walls 10 arranged in overlapping relation with the inner faces of the rim elements and the outer edges of the side walls, which are of substantial width, coincide with and have the same curvature as the outer edges of the rims.

The side walls of each spacer are integrally connected by a pair of transverse members 11 which are preferably in the form of gear teeth and together provide a gear segment with which gear teeth of a ground engaging shoe 12 are adapted to mesh. The shoe for each spacer may be advantageously of the character illustrated and described in detail in my copending application Serial No. 436,683, filed March 28, 1942, having a central tooth 13 and end teeth 14. The central tooth 13 of each shoe is formed with an extension having openings 15 in the sides thereof and with a transverse connecting bar 16. The openings 15 are adapted to receive a shoe retaining plate 17 which bridges the space between the two teeth 11 of the spacer and is rigidly secured thereto by bolts 18. The openings in the central tooth of each shoe through which the cooperating plate 17 passes is of a size to enable the shoe to angle sufficiently with respect to the rim so that the face of the shoe may assume a position substantially parallel with the surface over which the wheel is to pass at the time the weight of the wheel and the load it carries is transmitted to the shoe.

The two rim elements 2 and their spacers 8 are rigidly connected to the inner annular member 1 of the traction unit by a plurality of pairs of elongated members, the corresponding members of each of the pairs being designated 19 and 20, respectively. The outer ends of the elongated members of each pair are connected to the rim elements and to a single spacer member by the rivets 9 which connect the spacer and rim elements together. The elongated members of each pair, instead of being connected to the same rim element, are connected to different rim elements, that is to say, one elongated member of each pair is connected to one rim element, while the other member of that pair is connected to the other rim element.

To effect a very rigid connection between the elongated members and the rim elements and their spacer members, the upper portions of the side walls of each spacer are spaced inwardly from the inner faces of the respectively adjacent rim elements so that the outer ends of the elongated members may be interposed between the side walls of the spacers and the rim elements. In this way, the rivets 9 connecting the outer ends of the elongated members to the rim elements are placed in double shear.

At the diagonally opposite sides of the spacers where there are no elongated members, the side walls of the spacers may be conveniently formed with outwardly projecting bosses 21 of substantially the same thickness as the elongated members so that the adjacent rivets 9 may be tightly driven without subjecting the side walls to bending strains.

The elongated members 19 and 20 of each pair diverge toward the axis of the traction unit so that intermediate portions of adjacent members of adjoining pairs are arranged in overlapping relation, and the inner ends of members 19 and 20 of alternate pairs are secured to each other and to opposite sides of the outwardly projecting flange 4 of the annular member 1 by rivets 22.

Due to the fact that the elongated members of each pair not only diverge toward the axis of the traction unit but also because each of the elongated members inclines inwardly from the rim element to which it is secured for connection to the inner member 1 by rivets which are in double sheer, it will be evident that a very rigid and substantial traction unit has been devised which may be readily substituted for a conventional rubber tire and rim. Various changes and modifications may, of course, be made in detail features of the construction without departing from the spirit and scope of the invention as defined in the appended claims.

What I claim is:

1. An annular traction unit adapted to form the peripheral portion of a tractor wheel, said unit comprising an inner annular member adapted to be secured to the outer portion of said wheel, a pair of laterally spaced annular rim members encircling said inner annular member, spacer members interposed between and rigidly connected to said rim elements, and a plurality of pairs of elongated members rigidly connecting each of said rim elements to said inner annular member, the members of each of said pairs converging toward each other from their points of connection with the annular member to their points of connection with the rim element, the outer ends of each of said pairs of members being alternately connected to different ones of said rim elements and being secured to an adjacent spacer member at circumferentially spaced points.

2. An annular traction unit adapted to form a peripheral portion of a tractor wheel, said unit comprising an inner annular member adapted to be secured to the outer portion of said wheel, a pair of laterally spaced annular rim elements encircling said inner annular member, spacer members interposed between and rigidly connected to said rim elements, and a plurality of elongated members secured to each spacer member at circumferentially spaced points for connecting said rim elements to said inner annular member, the elongated members which are connected to alternate spacer members having their inner ends secured to each other and the elongated members which are secured to adjacent spacer members having intermediate portions arranged in overlapping relation with each other.

3. An annular traction unit adapted to form the peripheral portion of a tractor wheel, said unit comprising an inner annular member adapted to be secured to the outer portion of said wheel, a pair of laterally spaced annular rim elements encircling said inner annular member, spacer members interposed between and rigidly connected to said rim elements, and a plurality of pairs of elongated members rigidly connecting each of said rim elements to said inner annular member, the elongated members of each pair being secured to different rim elements and being arranged in overlapping relation with adjacent elongated members of adjoining pairs of said members.

4. An annular traction unit adapted to form the peripheral portion of a tractor wheel, said unit comprising an inner annular member adapted to be secured to the outer portion of said wheel, a pair of laterally spaced annular rim elements encircling said inner annular member, spacer members interposed between and rigidly connected to said rim elements, and a plurality of pairs of inwardly diverging elongated members respectively secured to said spacer members at circumferentially spaced points for connecting said rim elements to said inner annular member, the outer ends of the elongated members of each of said pairs being secured to different ones of said rim elements and the inner ends of the elongated members of alternate pairs thereof being connected together and to said inner annular member.

WILLIAM E. WINE.